June 15, 1965  R. G. SHALER  3,189,557
METHOD OF TREATMENT OF ORE AND PRODUCT
Filed April 6, 1964
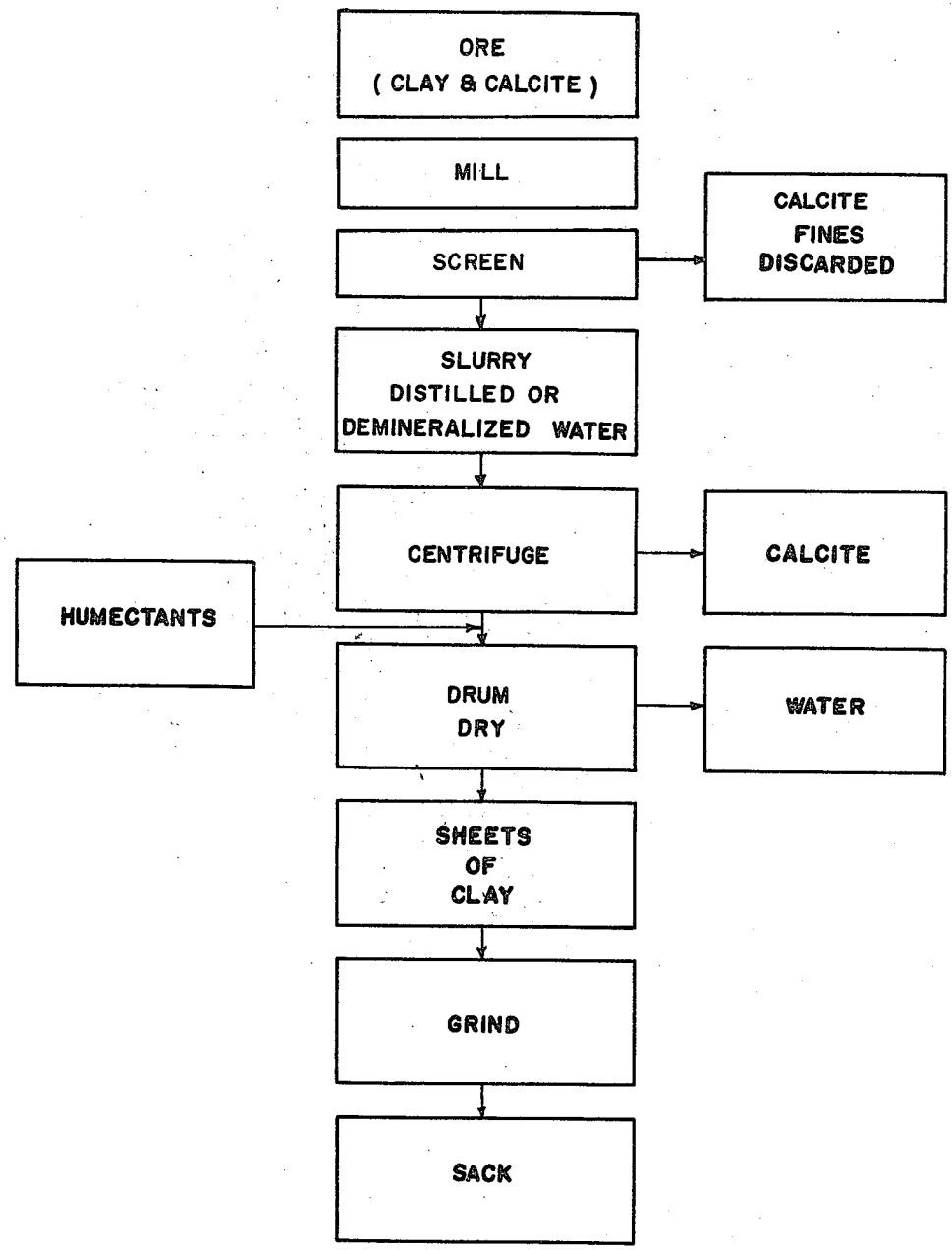
INVENTOR.
Richard G. Shaler
BY
Townsend and Townsend
attorneys

United States Patent Office 3,189,557
Patented June 15, 1965

3,189,557
METHOD OF TREATMENT OF ORE
AND PRODUCT
Richard G. Shaler, Las Vegas, Nev., assignor to
American Tansul Company, Las Vegas, Nev.
Filed Apr. 6, 1964, Ser. No. 355,070
18 Claims. (Cl. 252—428)

This invention relates to the treatment of ores and defines a method for removing impurities from the ores and drying the ore to provide a colloidal end product characterized by its freedom from impurities and capability for complete and rapid rehydration. This is a continuation in part of application Serial Number 695,261, filed November 8, 1957, now abandoned, and application Serial Number 815,480, filed May 25, 1959, now abandoned.

The invention is particularly adapted to the treatment of swelling, gelling clays of the montmorillonite group, and more particularly relates to the treatment of bentonite, saponite and preferably hectorite. Hectorite is magnesium lithium bentonite which occurs naturally in the vicinity of Hector, San Bernardino County, California. However, it is also generally adapted to all similar cation exchangeable swelling, gelling clays such as beidellite, various synthetic clays, nontronite, the zeolites, and the like.

The clays above identified occur in nature in the presence of impurities, of which the principal ones are calcium carbonate and calcium magnesiumcarbonate which are termed herein "calcite."

The separation of calcite has proven quite difficult. Due to the particular properties of the calcite, conventional methods of separation such as screening, magnetic separation, and sink and float processes have proven unsatisfactory. Centrifugation of a slurry of ore and water has been attempted, but it was found that if the slurry contained more than about 6%–7% solids, it became too viscous for the finer calcite particles to respond to centrifugation. By eliminating the anionic electrolytes, such as chlorides, however, it was found the viscosity of the slurry was reduced and a greater percentage of calcite was removed.

Another principal problem with which the invention is concerned is in the drying of the slurry. Unless the heat is controlled within very precise limits, the combined or molecular water in the clay is removed and the clay crystals collapse and calcine or burn. As a result of the inherent thermosetting characteristic of clay, the calcined clay will not subsequently rehydrate, which in effect replaces impurities which the present invention endeavors to eliminate.

In accordance with the present invention an aqueous slurry consisting of milled and screened ore combined with distilled water otherwise characterized by the absence of anionic electrolytes is centrifuged to remove the calcite impurities. A humectant having a boiling point higher than water is then added to the centrifuged, purified slurry and heat is applied at a temperature adequate to evaporate or drive off the water to a point that the ore is substantially dry, but leaving the humectant additive combined with the ore. The humectant additive thus prevents calcining of the ore in the drying stage and also affects the properties of the end product, principally in that the ore so treated rehydrates more rapidly and creates a more viscous gel than untreated ore.

One object of the present invention is to define a method whereby calcite may be effectively removed from the ore.

Another object resides in the addition of a humectant which is retained in the ore through the drying stage to prevent calcining and which lends desirable characteristics to the dried end product.

Another object is to produce an end product of ore substantially free of calcite and which readily and completely rehydrates in commercial applications.

A further feature of the invention is the reduction in the time and cost of centrifugation by reduction in the viscosity of the slurry treated.

Another feature of the invention is the decrease in time of drying the slurry and freedom from precise temperature control during the drying operation, which is afforded by the use of humectants.

The present invention thus provides a commercially practical method for producing a purified clay having particularly desirable properties. The invention has utility in connection with the purification of other ores in which similar problems are encountered.

The accompanying drawing shows a typical flow sheet for the process.

The present invention has reference to a treatment of that type of mineral which is referred to herein as "clay," such as those of the montmorillonite group, which in aqueous suspension swell and form gels. Among such clays are bentonite, saponite and hectorite. For purpose of illustration, the invention will be described with reference to the treatment of the preferred clay hectorite.

Hectorite is a sodium magnesium-fluoro-litho-silicate. The magnesium, lithium and fluorine are contained within the lattice structure of the hectorite and are not available to the solution in which the clay is dispersed. Thus, they cannot be released from the lattice structure except by severe chemical treatment. The exchangeable ion in hectorite is sodium. The impurities present in the hectorite are termed herein "calcite," it being understood that these are principally calcium carbonate and/or calcium magnesium carbonate, which are present with the hectorite as a mechanical mixture.

A suggested formula for hectorite is:

$$16MgO \cdot Li_2O \cdot 24SiO_2 \cdot 6(F_3H_2O)(Na_2O)$$

A typical chemical analysis thereof is:

| | |
|---|---|
| $SiO_2$ | 55.86 |
| $Al_2O_3$ | .13 |
| $Fe_2O_3$ | .03 |
| FeO | ---- |
| MmO | None |
| MgO | 25.03 |
| CaO | Tr |
| $K_2O$ | .10 |
| $Na_2O$ | 2.68 |
| $Li_2O$ | 1.05 |
| $TiO_2$ | None |
| $CO_2$ | ---- |
| F | 5.96 |
| $H_2O-$ | 9.90 |
| $H_2O+$ | 2.24 |

In practicing the invention the ore is first ground. A hammer mill having installed 1/8" to 3/16" screens has been successfully employed.

The ground ore is then screened as by passing it over a vibrating screen having 40- or 60-mesh stainless steel screen cloth. Material passing through this fine screen contains substantially entirely very fine crystals of calcite. Accordingly, the coarse material not passed through the screen is used to make the slurry. By using the above screening process, the amount of calcite in the finished slurry is reduced from around 10%–12% to about 8%.

An aqueous slurry of the ore is next prepared. In preparing the slurry, the use of distilled water, as distinguished from tap water or raw water, has been found very successful, inasmuch as electrolytes contained in the raw water materially increase the viscosity of the dispersion preventing separation of the finer calcite impurities. Elimination of anionic electrolytes such as chlorides from the water decreases the viscosity of the dispersion. In preparing the dispersion from about 7%–9% total solids are mixed with demineralized water for approximately one hour to form a water-thin slurry.

The slurry is then passed through a regular centrifuging process. Calcite is slightly heavier than the clay and is separated out to reduce the calcite concentration below 5%.

The calcite is then removed and a humectant having a higher boiling temperature than the operating temperature of the drier is added to the centrifuged material to constitute preferably from about 1%–20% of the total solids in the slurry (as distinguished from the slurry itself). The humectant is preferably added at this stage, subsequent to centrifuging, because it increases the viscosity of the slurry.

The centrifuged material with the combined humectant is then dried to remove all or most of the water. A double drum drier has been satisfactorily employed, passing a sheet of the material over the rolls heated to about 260° F., to evaporate the water leaving a relatively thin, dry sheet of clay which may subsequently be ground and sacked.

In commercial use the clay is rehydrated to form a gel for various purposes. However, in prior use of drum-drying, not only the uncombined water is driven off but as high as 50% of the combined or molecular water has been driven off, which produces an undesirably thin film which collapses and calcines. When it is desired to reconstitute the product for commercial purposes, the calcined clay does not rehydrate upon wetting and eventually settles out rather than swelling as a colloidal suspension.

Addition of the humectant increases the viscosity of the dispersion, and the product, when dried, forms a sheet which is relatively much thicker than the sheets produced when no humectant is added, and at the same time the sheet is much tougher and more flexible. The humectant prevents burning or calcining.

Accordingly, in the present invention, a humectant preferably having a boiling point higher than operating temperatures is added to the slurry to prevent calcining. The humectant thus will tend not to evaporate at the operating temperature of the drier. The humectant combines with the slurry to form a constant boiling point mixture retaining a small percentage of water in regular state at higher than the normal boiling point of water.

The term humectant, as used herein and in the claims, means and is intended to signify a water soluble diluent which acts like water and which is deliquescent and hygroscopic to the extent of becoming liquid, which has a boiling point above water and higher than the operating temperature to which the ore is subjected during processing in accordance with this invention; and which is chosen from the group of organically derived polyols including glycerol or glycerin, propylene glycol, ethylene glycol and polyethylene glycol and also polysaccharide materials, either natural, synthetic or modified, such as sorbitol or hexahydric alcohol, dextrine and dextran.

The properties of the end product will vary according to the type and amount of humectant used. Tests have been conducted adding humectants to the centrifuged slurry to constitute from about 1% of the total solids up to a ratio in excess of 20% of the solids. Where the product is to be dried following addition of the humectant, some of the humectants may be partially lost during the drying process even when they have a boiling point above the water. Therefore, it may be necessary with some humectants to add addtional amounts to the slurry to make up for the losses.

The amount of humectant remaining in the end product is a function of the boiling point of the humectant, the conditions of drying of the end product, and the amount of humectant added with the starting materials prior to drying. For example, where the humectant constitutes 10% by weight with respect to the clay but has a relatively low boiling point, a portion of this may be lost during drying, especially where the drying temperature is much above the boiling point of water. As a result, the finished dry product may contain only 4% or 5% humectant with respect to the clay. Where the humectant has a relatively high boiling point, substantially all of the humectant may be found in the end product. To further illustrate this point, propylene glycol having a boiling point of 188° C., when added to a clay slurry and dried, has been found to exist in the end product in an amount of only about 15% of the initially added material. On the other hand, diethylene glycol having a boiling point of 245° C., under the same conditions, has been found to be present in the end product in an amount of about 63% of the starting amount. Sorbitol, a preferred humectant, has been found to be present in many of the end products to which it has been added in amounts up to about 80% to 90% or more of the starting amount.

In view of the foregoing, it is difficult to give precise limits for the amount of humectant to be employed. It can be stated, however, that the humectant should be utilized in an amount sufficient to prevent calcining during drying of the clay and to improve the rehydration and viscosity properties of the dried clay. In general, this will require that the humectant be added so as to constitute at least about 1% by weight with respect to the clay and other solids in the finished product. Theoretically, there is no upper limit to the amount of humectant which may be utilized, but the limit will be governed by practical considerations such as economics as well as the specific properties desired in the end product. Thus where the end use dictates, humectants may constitute up to several thousand percent by weight with respect to the clay in the end product. However, in most cases, the humectant will be added to the centrifuged slurry so as to constitute about 1% to 20% by weight of the solids in the slurry. The amount of humectant in the end product will also generally be within this range although more may have been added prior to the drying step.

Where the preferred sorbitol is used as a humectant it has been found to provide optimum results when combined with the centrifuged slurry so as to constitute about 5% by weight with respect to the solids in the slurry. Using this amount, because of its resistance to loss during drying as noted above, it will generally be present in the dried end product in an amount of about 3% to 5% by weight with respect to the clay.

In other experiments, glycerin or glycerol added to constitute 5% based on the dry weight produced a resultant sheet on the drier much tougher than a control sheet not containing glycerin. When the humectant was increased to about 20% the resultant sheet was heavier, tougher, did not shrink, and rehydrated more rapidly than the control sheet.

A similar test was conducted using propylene glycol. At 2½%, the resultant sheet showed no noticeable difference over the control sheet, but at 5% the sheet became more flexible, ground relatively easy, hydrated more rapidly, and was not as dusty as the control sheet. At 20% the sheet did not shrink appreciably, was very tough and very white.

Using a 70% solution of sorbitol, which is quite hygroscopic, the sheet was rather tacky.

The resultant material may be described as relatively tough, flexible, and not dusty. Its principal advantage is that it completely hydrates in about half the time required for hydration of the untreated product, and develops about twice the viscosity or "yield value" of the untreated product when slurried.

One use of hectorite is as a beer stabilizer and purifier (see Joachim Patent No. 2,416,007). The treated product develops a more rapid, coarse, spongy floc which settles rapidly.

Another use of hectorite treated according to the present invention is as an additive to laundry starch which produces a flexible starching effect, prevents foaming of the starch and gives freedom from stickiness or tackiness.

Accordingly, the present invention provides a method of removing the impurities from certain ores as well as the new composition of matter thus produced. The use of distilled or demineralized water to form the slurry with the ore reduces the viscosity thereof and hence makes successful centrifuging more feasible, and the use of humectants prior to drying the slurry prevents driving off excessive moisture. The resultant product is more suitable for rehydration and its swelling and gelling properties are improved.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method of treating an ore of the montmorillonite family initially having calcite impurities comprising grinding the ore, forming an aqueous slurry of the ore, removing substantially all calcite impurities, adding a humectant having a boiling point above water selected from the group consisting of water soluble organic polyols and water soluble polysaccharides to constitute about 1–20% by weight of the total solids in the slurry, and drying the slurry.

2. A method of treating hectorite ore initially having calcite impurities comprising grinding the ore, forming an aqueous slurry of the ore, centrifuging the slurry to remove substantially all of the calcite impurities, and adding a water soluble organic polyol humectant having a boiling point above water to constitute about 5–20% by weight of the total solids in the slurry, and drying the slurry.

3. A method of treating hectorite ore initially having calcite impurities comprising grinding the ore, forming an aqueous slurry of the ore, centrifuging the slurry to remove substantially all calcite impurities, adding a water soluble polysaccharide humectant having a boiling point above water to constitute about 5–20% by weight of the total solids in the slurry, and drying the slurry.

4. A method in accordance with claim 2 wherein said humectant is propylene glycol.

5. A method in accordance with claim 2 wherein said humectant is glycerol.

6. A method in accordance with claim 2 wherein said humectant is polyethylene glycol.

7. A method in accordance with claim 2 wherein said humectant is ethylene glycol.

8. A composition of matter consisting essentially of a swelling, gelling clay of the montmorillonite family substantially free of calcite, and a humectant having a boiling point above water of from about 1–20% by weight of the composition selected from the group consisting of water soluble organic polyols and water soluble polysaccharides.

9. A composition of matter consisting essentially of hectorite substantially free of calcite, and a water soluble organic polyol humectant having a boiling point above water of from about 5–20% by weight of the composition.

10. A composition of matter consisting essentially of hectorite substantially free of calcite, and a water soluble polysaccharide humectant having a boiling point above water of from about 5–20% by weight of the composition.

11. A composition in accordance with claim 9 wherein said humectant is propylene glycol.

12. A composition in accordance with claim 9 wherein said humectant is glycerol.

13. A composition in accordance with claim 9 wherein said humectant is polyethylene glycol.

14. A composition in accordance with claim 9 wherein said humectant is ethylene glycol.

15. A method in accordance with claim 1 wherein the humectant is sorbitol.

16. A method of treating an ore of a swelling, gelling, cation exchangeable clay initially having calcite impurities comprising grinding the ore, forming an aqueous slurry of the ore, removing calcite impurities, adding a humectant having a boiling point above water selected from the group consisting of water soluble organic polyols and water soluble polysaccharides in an amount of at least 1% and sufficient to prevent calcining during drying of the ore, and drying the slurry.

17. A composition of matter consisting essentially of a swelling, gelling, cation exchangeable clay substantially free of calcite, and a humectant having a boiling point above water of from about 1–20% by weight of the composition selected from the group consisting of water soluble organic polyols and water soluble polysaccharides.

18. A composition in accordance with claim 17 wherein the humectant is sorbitol and constitutes 3% to 5% by weight of said composition.

References Cited by the Examiner

UNITED STATES PATENTS

| | | | |
|---|---|---|---|
| 1,498,270 | 6/24 | Harris | 252—309 |
| 1,524,843 | 2/25 | Ruprecht | 252—428 |
| 2,006,162 | 6/35 | Fuchs | 252—309 |
| 2,147,774 | 2/39 | Lyons | 23—110.2 |
| 2,240,041 | 4/41 | Hoskins et al. | 252—309 |
| 2,373,933 | 4/45 | Weeks | 252—309 |

TOBIAS E. LEVOW, *Primary Examiner.*